Patented Oct. 9, 1934

1,976,668

UNITED STATES PATENT OFFICE 1,976,668

PHARMACEUTICAL PREPARATION

Percy A. Houseman, Haddonfield, N. J., assignor to MacAndrews and Forbes Company, Camden, N. J., a corporation of New Jersey No Drawing. Application July 21, 1932, Serial No. 623,909

12 Claims. (Cl. 167—56)

My invention relates to a novel pharmaceutical preparation, and more particularly it relates to a new laxative or purgative pleasing to the taste and efficient and satisfactory in its action.

One object of my invention is to provide a new laxative containing Epsom salt which is not only palatable but is characterized by a modified action making it especially desirable for use.

A further object of my invention is to furnish a laxative composition containing Epsom salt and a second ingredient of laxative properties, the second ingredient overcoming the nauseating bitterness of the Epsom salt and modifying and lessening the griping action of the strongly purgative Epsom salt without reducing the value of the composition as a laxative.

Still another object of my invention is to provide a laxative containing Epsom salt and a milder laxative which acts as a demulcent to irritations of the mucous membrane of the bowels.

Other objects will be apparent from a consideration of the specification and claims.

Epsom salt is one of the best known and most widely used laxatives or purgatives. It, however, has an extremely bitter taste which renders it obnoxious to many people, particularly since the bitterness lingers in the mouth for an appreciable period after the solution of the salt is swallowed. In many instances, the Epsom salt because of its strongly purgative action causes a griping action and irritates the mucous lining of the bowels.

My invention contemplates a laxative containing Epsom salt in which all of these disadvantages are overcome. The laxative of the present invention has a pleasing sweet taste not only at the time of taking but also leaves a very pleasant sweet taste in the mouth for a considerable time, thus overcoming the nauseating bitterness of the Epsom salt. The laxative composition disclosed herein contains a mild laxative in addition to the Epsom salt which modifies and lessens the griping action of the strongly purgative Epsom salt. The mild laxative included in the composition also acts as a demulcent to irritations of the mucous membrane of the bowels.

The laxative of my invention contains Epsom salt (magnesium sulphate) and magnesium glycyrrhizate, also known as magnesuim glycyrrhizinate. The magnesium sulphate may be either crystalline or anhydrous, and the mixture may contain from 5% to 50% of the magnesium glycyrrhizate on the basis of crystal Epsom salt containing seven molecules of water of crystallization. Herein the term "Epsom salt" is used to include not only magnesium sulphate containing seven molecules of water but also magnesium sulphate containing less water of crystallization and anhydrous magnesium sulphate. The particular proportion of the two ingredients used depends upon the diminution of the bitterness and the modification and lessening of the griping action desired. The preferable mixture for most purposes is 80% powdered crystal Epsom salt containing seven molecules of water of crystallization and 20% magnesium glycyrrhizate, since this proportion overcomes the bitterness of the Epsom salt and is not prohibitive from the standpoint of cost, the magnesium glycyrrhizate being relatively expensive. The magnesium glycyrrhizate is freely soluble in water and is not precipitated when mixed with Epsom salt within the limits contemplated. The laxative composition of the present invention may be prepared by mixing the two ingredients in solid, powdered form in the desired proportions or it may be prepared by mixing solutions of the two ingredients containing the two compounds in the desired proportions, evaporating and drying the mixed solution and powdering the resultant dry solid. When the laxative is to be administered, the composition is merely dissolved in water as is commonly done with Epsom salt.

The magnesium glycyrrhizate may be obtained from licorice root since glycyrrhizin is the sweet principle of licorice. The licorice root is treated to obtain an aqueous extraction to which is added a mineral acid, preferably sulphuric acid, which causes a precipitate to form. The precipitate is then washed and dissolved in magnesium hydroxide. The magnesium glycyrrhizate is obtained by evaporating the solution.

The constitution of the glycyrrhizin, also termed "glycyrrhizic acid" and "glycyrrhizinic acid", or of the magnesium salt is only partially known but it has been determined that the acid is a tri-basic acid containing three carboxyl (COOH) groups. Therefore, mono-, di-, and tri- or primary, secondary, and tertiary salts are obtainable as one, two or three atoms of hydrogen are replaced. Preferably, the tri-magnesium glycyrrhizate is employed because of its high content of magnesium, but the di- or mono-salts may be used and are within the present invention. It is also possible to replace one or two hydrogen atoms with a non-poisonous metal or positive radicle other than magnesium, for example by sodium, potassium, ammonium, strontium, or calcium, but so long as the compound contains magnesium and is water-soluble, it is contemplated herein. The term "magnesium glycyrrhizate", therefore, includes not only the tri-magnesium salt but also the mono- and di-salts and the mixed salts of the type of magnesium-ammonium-glycyrrhizate where one or two hydrogen atoms are replaced by other non-poisonous elements or radicles.

The laxative composition of the present invention relies for its laxative action on the magnesium and sulphate radicles of the Epsom salt and the magnesium of the magnesium glycyrrhizate. The glycyrrhizate radicle is virtually non-laxative, but it modifies and lessens the griping action of the strongly purgative Epsom salt and acts as a demulcent to irritations of the mucous membrane of the bowels.

Considerable modification is possible in the proportion of magnesium glycyrrhizate to Epsom salt employed as well as in the constitution of the magnesium glycyrrhizate without departing from the essential features of my invention.

I claim:

1. A laxative comprising Epsom salt and magnesium glycyrrhizate.
2. A laxative comprising Epsom salt and magnesium glycyrrhizate, the latter compound making up from 5% to 50% of the mixture based on Epsom salt containing seven molecules of water of crystallization.
3. A laxative comprising approximately 80% Epsom salt and approximately 20% magnesium glycyrrhizate based on Epsom salt containing seven molecules of water of crystallization.
4. A laxative comprising Epsom salt and tri-magnesium glycyrrhizate.
5. A laxative comprising Epsom salt and tri-magnesium glycyrrhizate, the latter compound making up from 5% to 50% of the mixture based on Epsom salt containing seven molecules of water of crystallization.
6. A laxative comprising approximately 80% Epsom salt and approximately 20% tri-magnesium glycyrrhizate based on Epsom salt containing seven molecules of water of crystallization.
7. A laxative comprising Epsom salt and di-magnesium glycyrrhizate.
8. A laxative comprising Epsom salt and di-magnesium glycyrrhizate, the latter compound making up from 5% to 50% of the mixture based on Epsom salt containing seven molecules of water of crystallization.
9. A laxative comprising approximately 80% Epsom salt and approximately 20% di-magnesium glycyrrhizate based on Epsom salt containing seven molecules of water of crystallization.
10. A laxative comprising Epsom salt and mono-magnesium glycyrrhizate.
11. A laxative comprising Epsom salt and mono-magnesium glycyrrhizate, the latter compound making up from 5% to 50% of the mixture based on Epsom salt containing seven molecules of water of crystallization.
12. A laxative comprising approximately 80% Epsom salt and approximately 20% mono-magnesium glycyrrhizate based on Epsom salt containing seven molecules of water of crystallization.

PERCY A. HOUSEMAN.